United States Patent
Cheah et al.

(10) Patent No.: US 10,776,026 B2
(45) Date of Patent: *Sep. 15, 2020

(54) DYNAMIC DATA COMPRESSION

(71) Applicant: Nutanix, Inc., San Jose, CA (US)

(72) Inventors: ChernYih Cheah, Seattle, WA (US);
Kiran Tatiparthi, Dublin, CA (US);
Manosiz Bhattacharyya, San Jose, CA (US); Varun Kumar Arora, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,242

(22) Filed: Jan. 23, 2019

(65) Prior Publication Data
US 2019/0171382 A1 Jun. 6, 2019

Related U.S. Application Data

(63) Continuation of application No. 15/448,928, filed on Mar. 3, 2017, now Pat. No. 10,203,897.
(Continued)

(51) Int. Cl.
*G06F 3/06* (2006.01)
*G06F 13/20* (2006.01)

(52) U.S. Cl.
CPC .......... *G06F 3/0638* (2013.01); *G06F 3/061* (2013.01); *G06F 3/0608* (2013.01);
(Continued)

(58) Field of Classification Search
CPC ...... G06F 3/0638; G06F 3/061; G06F 6/0673; G06F 13/20
(Continued)

(56) References Cited

U.S. PATENT DOCUMENTS

| 4,730,348 A | * | 3/1988 | MacCrisken | .......... | H03M 7/42 |
| | | | | | 370/472 |
| 5,001,625 A | | 3/1991 | Thomas et al. | | |
| | | (Continued) | | | |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Paul R. Myers
(74) *Attorney, Agent, or Firm* — Vista IP Law Group, LLP

(57) ABSTRACT

Techniques for performing compression operations on persistently-stored data blocks during read/write commands. A method embodiment performs in-line data compression operations over data blocks referenced by a caller. The in-line data compression operations are performed during execution of a storage input-output (I/O) command, between the event of receipt of the storage I/O command and the event of returning status of the storage I/O command. The storage I/O operation is associated with at least one data group comprising one or more data blocks that are identified by the caller. Upon receipt of the storage I/O command, one or more compression rules are applied to the data blocks to determine one or more compression parameters, which compression parameters are used to form specific compression operations that are performed over at least a portion of the data group. The status pertaining to the execution of the storage I/O operation is returned to the caller.

27 Claims, 15 Drawing Sheets

Related U.S. Application Data

(60) Provisional application No. 62/429,671, filed on Dec. 2, 2016.

(52) U.S. Cl.
CPC .......... G06F 3/0673 (2013.01); G06F 3/0685 (2013.01); G06F 13/20 (2013.01)

(58) Field of Classification Search
USPC .......................................................... 710/68
See application file for complete search history.

(56) References Cited

U.S. PATENT DOCUMENTS

| | | | |
|---|---|---|---|
| 5,151,949 A | | 9/1992 | Miyata |
| 5,396,623 A | * | 3/1995 | McCall .................. G06F 16/25 |
| 6,711,709 B1 | | 3/2004 | York |
| 7,415,530 B2 | | 8/2008 | Fallon |
| 7,603,530 B1 | * | 10/2009 | Liikanen ............. G06F 11/2084 |
| | | | 711/156 |
| 8,407,437 B1 | * | 3/2013 | Cheng .................. G06F 11/108 |
| | | | 711/103 |
| 8,549,518 B1 | | 10/2013 | Aron et al. |
| 8,601,473 B1 | | 12/2013 | Aron et al. |
| 8,850,130 B1 | | 9/2014 | Aron et al. |
| 8,997,097 B1 | | 3/2015 | Aron et al. |
| 9,014,265 B1 | | 4/2015 | Rintaluoma |
| 9,052,936 B1 | | 6/2015 | Aron et al. |
| 9,054,728 B2 | | 6/2015 | Fallon |
| 9,116,908 B2 | | 8/2015 | Fallon |
| 9,256,374 B1 | | 2/2016 | Aron et al. |
| 9,256,475 B1 | | 2/2016 | Aron et al. |
| 9,354,912 B1 | | 5/2016 | Aron et al. |
| 9,389,887 B1 | | 7/2016 | Aron et al. |
| 9,575,784 B1 | | 2/2017 | Aron et al. |
| 9,619,257 B1 | | 4/2017 | Aron et al. |
| 9,667,751 B2 | | 5/2017 | Fallon et al. |
| 9,772,866 B1 | | 9/2017 | Aron et al. |
| 9,934,235 B2 | | 4/2018 | Gupta |
| 10,203,897 B1 | * | 2/2019 | Cheah .................. G06F 3/0638 |
| 2003/0099238 A1 | | 5/2003 | Payne et al. |
| 2005/0086249 A1 | | 4/2005 | Keohane et al. |
| 2005/0193162 A1 | | 9/2005 | Chou et al. |
| 2006/0193470 A1 | * | 8/2006 | Williams .............. H04L 9/0894 |
| | | | 380/259 |
| 2011/0103164 A1 | * | 5/2011 | Yun ........................ G11C 29/40 |
| | | | 365/201 |
| 2011/0167173 A1 | | 7/2011 | Bansal et al. |
| 2011/0199241 A1 | | 8/2011 | Torii |
| 2011/0202673 A1 | | 8/2011 | Vadlakonda et al. |
| 2013/0205067 A1 | * | 8/2013 | Kettner ................... G06F 3/061 |
| | | | 711/103 |
| 2014/0351229 A1 | | 11/2014 | Gupta |
| 2016/0099076 A1 | * | 4/2016 | Oh ......................... G11C 29/40 |
| | | | 714/719 |
| 2019/0138446 A1 | * | 5/2019 | Iyer ..................... G06F 12/0886 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Non-Final Office Action dated May 23, 2018 for corresponding U.S. Appl. No. 15/448,928, 6 pages.

Notice of Allowance dated Sep. 20, 2018 for corresponding U.S. Appl. No. 15/448,928, 5 pages.

\* cited by examiner ately larger volumes of data. For example, "big data" is
DYNAMIC DATA COMPRESSION

RELATED APPLICATIONS

The present application is a continuation of U.S. patent application Ser. No. 15/448,928 titled "DYNAMIC DATA COMPRESSION", filed on Mar. 3, 2017, which claims the benefit of priority U.S. Provisional Patent Application Ser. No. 62/429,671 titled "DYNAMIC DATA COMPRESSION", filed Dec. 2, 2016, which are all hereby incorporated by reference in their entireties.

FIELD

This disclosure relates to data storage, and more particularly to techniques for in-line data compression.

BACKGROUND

Modern computing and storage systems manage increasingly larger volumes of data. For example, "big data" is often collected from a myriad of information sensing devices (e.g., mobile phones, online computers, RFID tags, sensors, etc.) and/or operational sources (e.g., point of sale systems, accounting systems, CRM systems, etc.). Many modern computing systems further include virtualized entities (VEs), such as virtual machines (VMs) or executable containers, to improve the utilization of computing resources. VMs can be characterized as software-based computing "machines" implemented in virtualization environments of the computing system that uses software to emulate the underlying hardware resources (e.g., CPU, memory, etc.). The executable containers implemented in container virtualization environments in computing systems comprise groups of processes and/or resources (e.g., memory, CPU, disk, etc.) that are isolated from the host computer and other executable containers. Some computing and storage systems might scale to several thousand or more autonomous VEs, each having a corresponding set of entity management data (e.g., entity metadata) and a set of workload data—all managed by the computing and storage system.

The resulting highly dynamic storage capacity and high I/O (input/output or IO) demands of the VEs has in turn brought to bear an increase in a need for high-performance distributed storage systems. Distributed storage systems can aggregate various physical storage facilities to create a logical storage pool where data may be efficiently distributed according to various metrics and/or objectives (e.g., resource usage balancing). In some cases, data compression becomes important to reduce the overall storage capacity demand of the computing and storage system.

Unfortunately, some legacy compression techniques merely compress the data stored in an entire disk (e.g., physical disk, virtual disk, etc.) or an entire file according to a certain batch schedule. For example, a 4 MB file might be compressed to 3 MB at some later moment in time (e.g., in a later-scheduled batch operation), however the entire 4 MB of storage capacity remains in use so long as the application is writing and/or modifying the file. What is needed is a technological solution for efficient data compression in highly dynamic computing and storage systems such that compressible but not yet compressed data is not stored for long periods of time.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamic data compression, which techniques advance the relevant technologies to address technological issues with legacy approaches. More specifically, the present disclosure provides a detailed description of techniques used in systems, methods, and in computer program products for implementing fine-grained compression analysis of data during performance of storage I/O operations.

The disclosed embodiments modify and improve over legacy approaches. In particular, the herein-disclosed techniques provide technical solutions that address the technical problems attendant to achieving efficient persistent storage data compression in highly dynamic computing and storage systems. Such technical solutions relate to improvements in computer functionality. Various applications of the herein-disclosed improvements in computer functionality serve to reduce the ongoing demand for computer storage, reduce ongoing demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing platform management as well as advances in various technical fields related to distributed storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
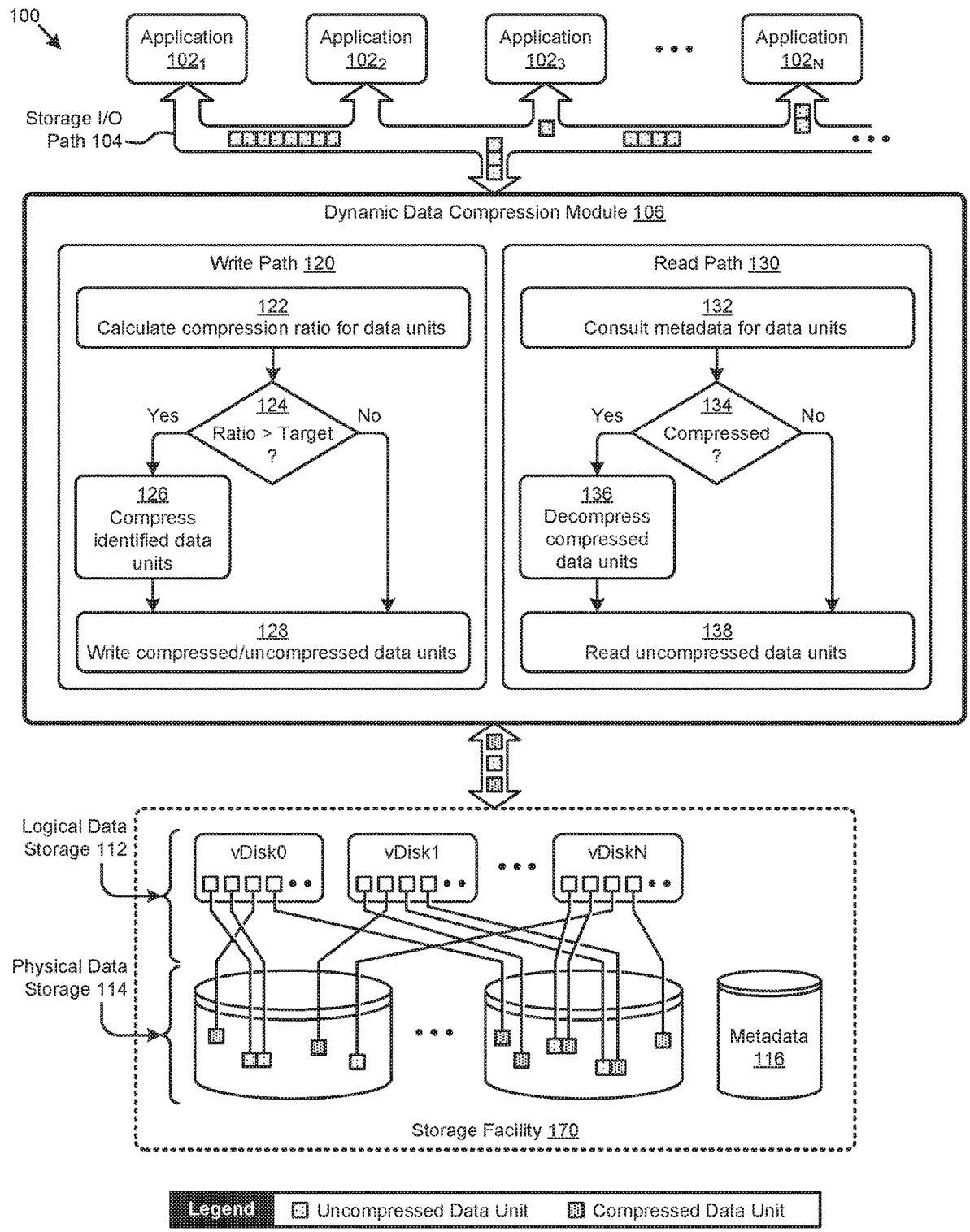
FIG. 1 illustrates a computing environment in which embodiments of the present disclosure can be implemented.

Embodiments in accordance with the present disclosure address the problem of achieving efficient persistent storage data compression in highly dynamic computing and storage systems. Some embodiments are directed to approaches for implementing a fine-grained compression analysis of data during performance of storage I/O operations to dynamically determine compression instructions for the data. The accompanying figures and discussions herein present example environments, systems, methods, and computer program products for in-line fine-grained compression of data in a storage I/O path.

Overview

Disclosed herein are techniques for implementing a fine-grained compression analysis of data during read/write accesses to dynamically determine compression parameters for the data. In certain embodiments, a set of data (e.g., blocks) associated with a storage I/O command (e.g., write command or read command) is partitioned into one or more data units. Each data unit is analyzed to determine certain data unit attributes associated with a particular data unit or set of data units. In this and other settings, a data unit attribute is any computer readable representation of a characteristic of a data unit or set of data units.

Next, a set of compression rules are applied over the data unit attributes (e.g., compressibility ratio, data type, access frequency, etc.) of each data unit to determine one or more compression parameters for the data unit. The storage I/O command is then executed for the data units according to the compression parameters. In certain embodiments, the compression parameters are values that indicate whether a data unit being written to persistent storage is to be compressed and, if so, what type of compression technique and/or storage allocation cushion is to be used. In certain embodiments, and strictly as an example, the compression parameters serve to indicate that a data unit accessed in a read command might be decompressed in persistent storage in response to the historical access patterns for the data unit (e.g., when the data is "hot"). In certain embodiments, portions of stored representations of the data can be asynchronously analyzed to determine compression parameters and/or compression operations, if any, to apply to the stored data. As examples, stored representations of the data can be compressed stored data or uncompressed stored data (e.g., with or without overwrites), which stored data can be asynchronously analyzed to determine compression parameters and/or compression operations, if any, are to be applied to the stored data.

Applications of the disclosed techniques address opportunities to reduce the storage capacity in real time, such as at the moment in time the data is being written and/or modified (e.g., by a running application). Certain portions (e.g., data units) of the data might be responsive to a first compression technique but not responsive to a second compression technique, and/or in some cases data might be deemed to be uncompressible (e.g., based on some quantifiable metric, or based on some rule pertaining to the data or pertaining to the application). In some cases, data processed by a first compression technique may actually consume more storage capacity when such compression is attempted due to the overhead (e.g., metadata) associated with the compression operation. Accordingly, compression of a particular data unit is sometimes deferred for later consideration.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be used to implement the functionality of the embodiments described herein.

The embodiment shown in FIG. 1 is merely one example of a computing environment in which the herein disclosed techniques can be implemented. As shown, the computing environment 100 comprises a plurality of applications (e.g., application $102_1$, application $102_2$, application $102_3$, . . . , application $102_N$) that interact with data in a storage facility 170 through storage I/O commands (e.g., input/output commands or IO commands, or storage IO operations) over a storage I/O path. As illustrated, the applications can invoke storage I/O operations over the storage I/O path 104 that pertain to data groups comprising any number of data units. In the shown embodiment, the data stored and accessed by the applications at storage facility 170 are organized in a set of logical data storage 112 comprising multiple virtual disks (e.g., vDisk0, vDisk1, . . . , vDiskN). The logical data referenced in the logical data storage 112 are mapped to physical stored representations of the data in a set of physical data storage 114 (e.g., solid state drives or SSDs, hard disk drives or HDDs, networked storage, etc.). A set of metadata 116 stores the mapping from the logical domain to the physical domain, and/or other attributes pertaining to the data groups and/or data units.

According to the herein disclosed techniques, the storage I/O operations between the applications and the storage facility 170 pass through a dynamic data compression module 106 to facilitate performance of in-line data compression operations of the data in storage I/O path 104. More specifically, the dynamic data compression module 106 facilitates fine-grained compression analysis of data during read/write accesses to dynamically determine compression parameters for the data, which compression parameters are used (e.g., in whole or in part) in preparation of, and/or in performance of data compression operations during performance of storage I/O commands.

As shown, any data units in any write path 120 of the storage I/O path 104 are analyzed to calculate a compression ratio (step 122). In this and certain other embodiments, a compression ratio is a ratio of the physical storage area consumed by a compressed representation of a data unit to the physical storage area consumed by an uncompressed representation of the same data unit. As an example, a 75% compression ratio for a particular data unit indicates that storing a compressed representation of the data unit will consume 75% of the storage area consumed by an uncompressed representation of the data unit. If the ratio of certain data units is greater than some predetermined target (see "Yes" path of decision 124), then those identified data units are compressed (step 126) and then written as compressed data units to the storage facility 170 (step 128). If the ratio of certain other data units is not greater than some predetermined target (see "No" path of decision 124), then those identified data units are written as uncompressed data units to the storage facility 170 (step 128).

Also, the metadata (e.g., metadata 116) of any data units in a read path 130 of the storage I/O path 104 is consulted to determine various compression (or decompression) operations (if any) that pertain to the data units (step 132). For example, if the metadata indicates the stored representations of certain data units are compressed (see "Yes" path of decision 134), the stored representations of the identified data units are decompressed (step 136) and then the uncompressed representation is read according to the storage I/O operation (step 138). If the metadata indicates the stored representations of certain other data units are uncompressed (see "No" path of decision 134), then the stored representations of the identified data units are read directly from the storage facility 170 (step 138).

Figure 2:
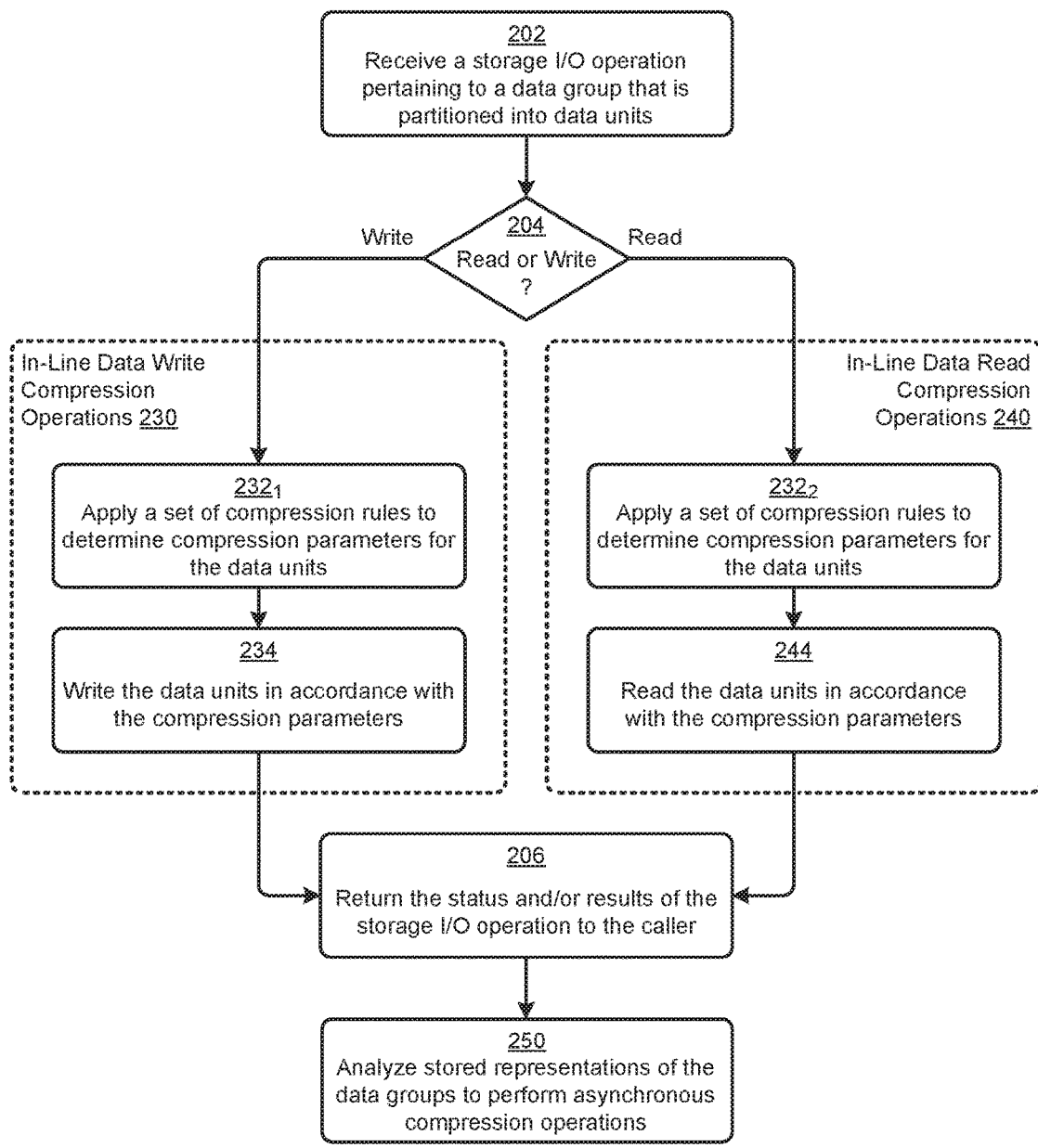
FIG. 2 depicts a dynamic data compression technique as used in systems that implement in-line fine-grained compression of data in a storage I/O path.

Further details describing the aforementioned in-line read/write data compression techniques are shown and discussed as pertaining to FIG. 2.

FIG. 2 depicts a dynamic data compression technique 200 as used in systems that implement in-line fine-grained compression of data in a storage I/O path. As an option, one or more variations of dynamic data compression technique 200 or any aspect thereof may be implemented in the context of the architecture and functionality of the embodiments described herein. The dynamic data compression technique 200 or any aspect thereof may be implemented in any environment.

The dynamic data compression technique 200 presents one embodiment of certain steps and/or operations that facilitate an in-line fine-grained compression analysis of data units to determine compression actions associated with storage I/O operations. The dynamic data compression technique 200 can commence by receiving a storage I/O operation that pertains to a data group that can be partitioned into a set of data units (step 202). A storage I/O operation is a command or action taken by a computing system to control or observe behavior of a storage facility. A data unit is any bound, reference or description of blocks of information that can be subjected to a storage I/O command. A data unit or a set of data units can be combined into a data group. As such, a data group is any collection of data units.

Continuing the discussion of dynamic data compression technique 200, strictly as an example, a storage I/O operation might pertain to an extent group or file comprising a set of extents, slices, blocks, areas, or regions. The determination of a particular form or format of an extent, or slice, or block, or area, or region might be determined based on a target storage device. For example, a particular type of hard disk drive might have a block size of 512 bytes, or a different type of hard disk drive might have a block size of 1024 bytes, or a solid state storage device might have a block size of 4 k bytes, etc. An extent, or slice, or block, or area, or region might be referred to by a number (e.g., logical block number, logical offset, etc.), and such a number can be used in formation of a storage I/O command that specifies a storage I/O operation.

If the storage I/O operation is a write operation (see "Write" path of decision 204), a set of in-line data write compression operations (grouping 230) are performed. Specifically, a set of compression rules are applied to the data units of the data group to determine certain compression parameters for the data units (step $232_1$). A compression rule is a codification of a test and/or action that can be applied to a characteristic of a storage facility. A first compression rule can be chained to a second and/or an Nth compression rule to form a plurality of compression rules.

Continuing, the write operation (e.g., write instructions) are then executed in accordance with the compression parameters (step 234). For example, the compression parameters might indicate whether a data unit being written to persistent storage is to be compressed and, if so, what type of compression technique and/or storage allocation cushion is to be used.

If the storage I/O operation is a read operation (see "Read" path of decision 204), a set of in-line data read compression operations (grouping 240) are performed. Specifically, a set of compression rules are applied to the data units of the data group to determine certain compression parameters for the data units (step $232_2$). The read operation (e.g., read instructions) are then executed in accordance with the compression parameters (step 244). For example, the compression parameters might indicate that a data unit accessed in a read command might be decompressed in persistent storage in response to the historical access patterns for the data unit (e.g., when the data is "hot").

When the storage I/O operation (e.g., write operation or read operation) is executed, the status and/or results of the operation are returned to the caller of the operation (step 206). In certain embodiments, portions of the stored representations of the data groups and/or data units (e.g., uncompressed stored data with many overwrites) can be analyzed to determine compression parameters and/or compression operations, if any, to perform over the stored data (step 250). In some embodiments, analysis of the stored data can be performed asynchronously to the in-line data write compression and/or the in-line data read compression.

In this and other embodiments, a compression operation is an action performed over a set of data. In certain embodiments, a first representation of the set of data is modified by the action to form a second representation. Performance of a compression operation is often accompanied by a reduction in size of the second representation relative to the first representation, however in some cases a second representation is associated with metadata pertaining to the second representation. The combination of the second representation and its metadata might be larger than the first representation of the set of data.

Figure 3A:
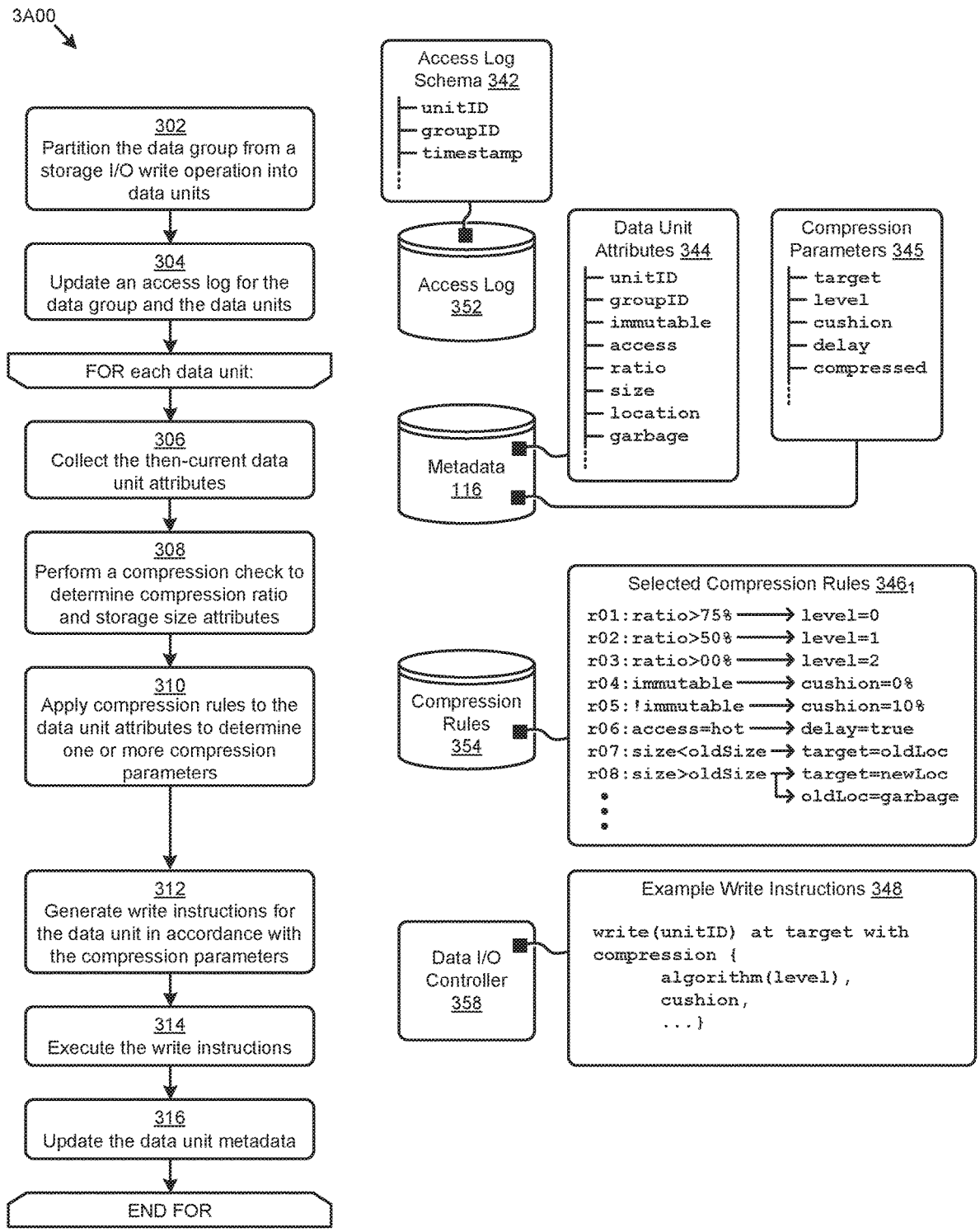
FIG. 3A presents an in-line write data compression technique as implemented in systems for in-line fine-grained compression of data in a storage I/O path, according to an embodiment.
Figure 3B:
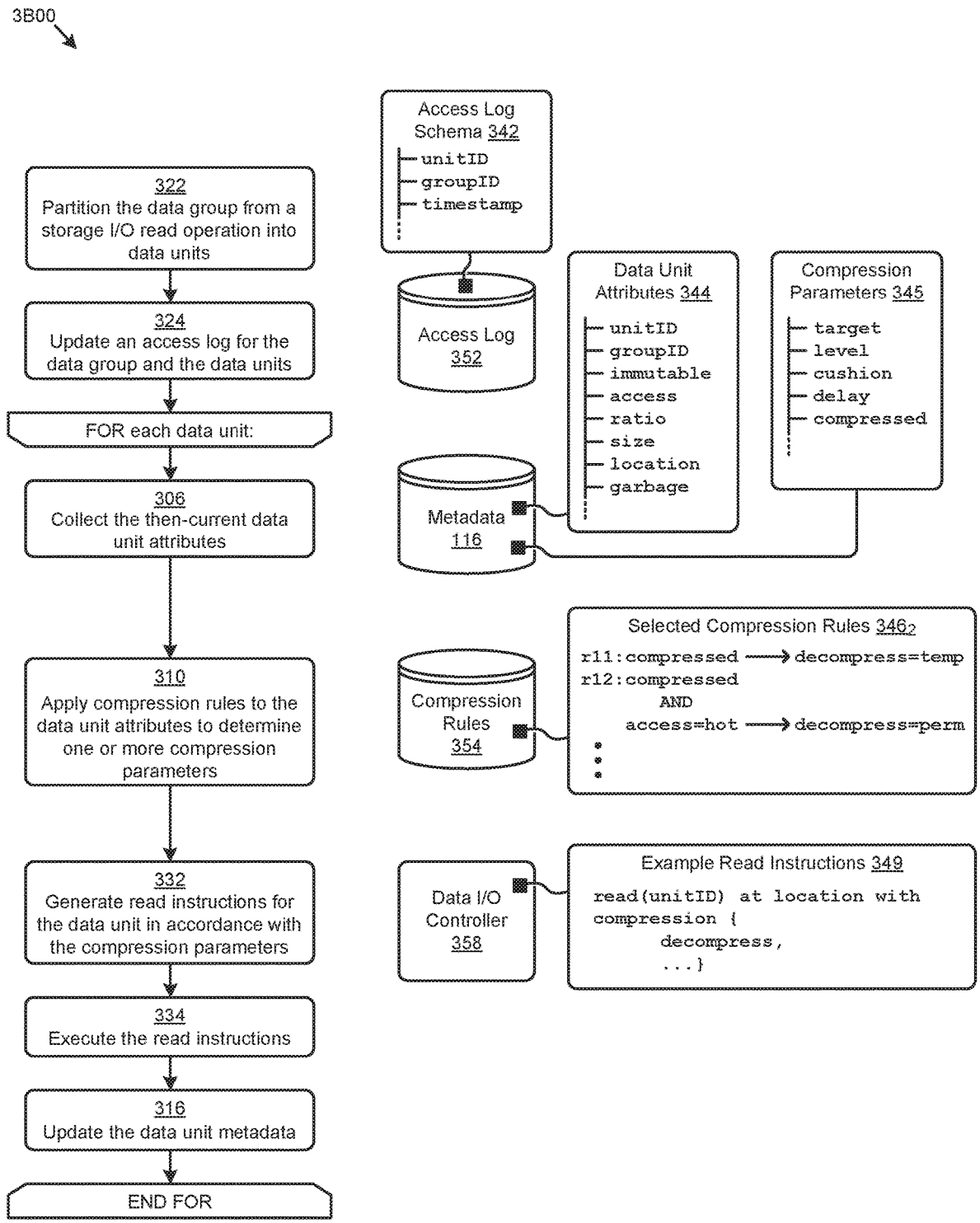
FIG. 3B presents an in-line read data compression technique as implemented in systems for in-line fine-grained compression of data in a storage I/O path, according to an embodiment.
Figure 3C:
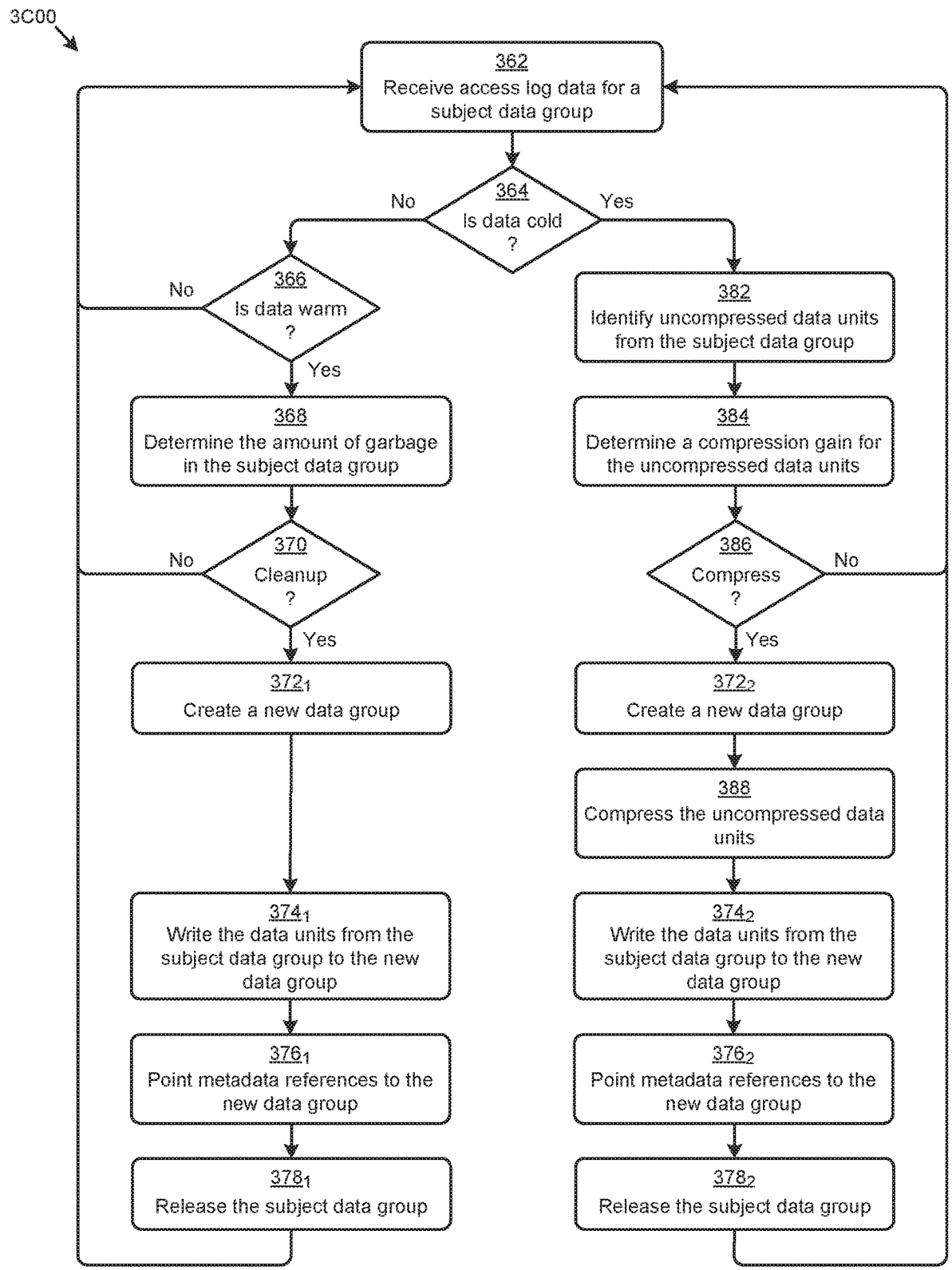
FIG. 3C depicts an asynchronous compression technique as implemented in systems for in-line fine-grained compression of data in a storage I/O path, according to an embodiment.

Embodiments of techniques for implementing the aforementioned in-line data write compression, in-line data read compression, and asynchronous stored data compression are shown and described as pertaining to FIG. 3A, FIG. 3B, and FIG. 3C, respectively.

FIG. 3A presents an in-line write data compression technique 3A00 as implemented in systems for in-line fine-grained compression of data in a storage I/O path. As an option, one or more variations of in-line write data compression technique 3A00 or any aspect thereof may be implemented in the context of the architecture and functionality of the embodiments described herein. The in-line write data compression technique 3A00 or any aspect thereof may be implemented in any environment.

The in-line write data compression technique 3A00 presents one embodiment of certain steps and/or operations that facilitate an in-line fine-grained compression analysis of data units to determine compression actions (e.g., based on compression rules 354) that are associated with storage I/O operations. Specialized data structures designed to improve the way a computer stores and retrieves data in memory when performing the in-line write data compression technique 3A00 and/or other herein disclosed techniques are also shown.

The in-line write data compression technique 3A00 can commence by partitioning a data group from a storage I/O write operation into one or more data units (step 302). An access log is updated to record the data unit access associated with the write operation (step 304). An access log 352 might store such access information organized and/or stored in a tabular structure (e.g., relational database table). Such tabular structures might have rows corresponding to a particular data unit and columns corresponding to various access attributes pertaining to that data unit. For example, and as depicted in access log schema 342, a table row might describe a unit identifier or "unitID" of a given data unit, a data group identifier or "groupID" associated with the data unit, a "timestamp" corresponding to the time of the subject storage I/O write operation, and/or other access attributes of the data unit.

For each data unit in the data group associated with the storage I/O write operation, a then-current set of data unit attributes are collected (step 306). For example, metadata 116 might be accessed to collect certain attributes pertaining to the data unit. The data unit attributes are often organized and/or stored in a tabular structure (e.g., relational database table). Such tabular structures might have rows corresponding to a particular data unit and columns corresponding to various attributes pertaining to that data unit. For example, and as depicted in data unit attributes 344, a table row might describe a unit identifier or "unitID" of a given data unit, a data group identifier or "groupID" associated with the data unit, an "immutable" indicator, an "access" level indicator (e.g., hot, warm, cold, etc.), a compression "ratio", a compressed storage "size", a storage "location", a "garbage" indicator (e.g., when marked as garbage), and/or other attributes of the data unit.

In some cases (e.g., a data unit overwrite), certain attributes comprising the then-current attributes of the data unit might be earlier established. In other cases, certain attributes pertaining to the data unit are dynamically determined in line by the herein disclosed techniques and/or other operations. Specifically, and as shown in the embodiment of FIG. 3A, the compression "ratio" and compressed storage "size" attributes are determined by performing a compression efficiency test over the data unit (step 308). For example, an LZ4 compression algorithm might be implemented to perform the compression efficiency test due to its execution time. A set of compression rules (e.g., selected compression rules $346_1$) are applied to the data unit attributes to determine certain compression parameters (step 310). A set of rules (e.g., rule base) such as selected compression rules $346_1$ comprises data records storing various information that can be used to form one or more constraints to apply to certain functions and/or operations.

For example, the information pertaining to a rule in the rule base might comprise the conditional logic operands (e.g., input variables, constraints, thresholds, etc.) and/or operators (e.g., "if", "then", "and", "or", "greater than", "less than", etc.) for forming a conditional logic statement that returns one or more results. For example, and as depicted diagrammatically in the shown selected compression rules $346_1$, rules "r01", "r02", and "r03" determine a compression "level" parameter by a comparison of the compression "ratio" to various thresholds. Also, a storage "cushion" compression parameter is conditionally determined in rules "r04" and "r05" based on the "immutable" data unit attribute. In some cases, a compression "delay" parameter might be set to "true" if the data unit "access" attribute is "hot" (rule "r06"). In some situations (e.g., under a given set of conditions), multiple rules can fire under one particular set of conditions. In other cases, one rule can determine multiple compression parameters. For example, in an overwrite scenario, rule "r08" states that if the data unit "size" is greater than the then-current storage size (e.g., "oldsize"), then the data unit write storage "target" is to be a new storage location (e.g., "newLoc") and the then-current storage location (e.g., "oldLoc") is to be marked as "garbage". As can be observed, the foregoing compression parameters (e.g., compression parameters 345) and/or other parameters can be stored in metadata 116.

When the compression parameters have been determined, a set of write instructions are generated in accordance with the compression parameters (step 312). As shown in the example write instructions 348, a "write" instruction for a certain data unit "unitID" can be issued to store the data unit at a "target" location in accordance with the dynamically determined compression parameters. Specifically, the compression parameters might indicate that, upon write of the data unit, a compression delay (e.g., "delay") is to be observed (or not observed), and/or if a particular compression "algorithm" is to be selected based on the determined compression "level", and/or if a storage "cushion" is be calculated and implemented, and/or if other compression directives are to be performed. The generated write instructions are then executed (e.g., at data I/O controller 358) (step 314) and any remaining updates to the data unit metadata (e.g., at metadata 116) are performed (step 316). As an example, the "compressed" indicator might be set upon confirmation of a write of a compressed representation of the data unit.

FIG. 3B presents an in-line read data compression technique 3B00 as implemented in systems for in-line fine-grained compression of data in a storage I/O path. As an option, one or more variations of in-line read data compression technique 3B00 or any aspect thereof may be implemented in the context of the architecture and functionality of the embodiments described herein. The in-line read data compression technique 3B00 or any aspect thereof may be implemented in any environment.

The in-line read data compression technique 3B00 presents one embodiment of certain steps and/or operations that facilitate an in-line fine-grained compression analysis of data units to determine compression actions associated with read operations. Specialized data structures designed to improve the way a computer stores and retrieves data in memory when performing the in-line read data compression technique 3B00 and/or other herein disclosed techniques are also shown. The in-line read data compression technique 3B00 can commence by partitioning a data group from a storage I/O read operation into one or more data units (step 322). An access log is updated to record the data unit access associated with the read operation (step 324). For example, access information can be recorded in access log 352 according to the access log schema 342.

For each data unit in the data group associated with the storage I/O read operation, a then-current set of data unit attributes are collected (step 306). For example, metadata 116 might be accessed to collect one or more of the data unit attributes 344. In many cases (e.g., a data unit read), certain attributes comprising the then-current attributes of the data unit are earlier established. A set of compression rules (e.g., selected compression rules 346$_2$) are applied to the data unit attributes to dynamically determine one or more compression parameters (step 310). For example, and as depicted diagrammatically in selected compression rules 346$_2$, rule "r11" indicates that any "compressed" data unit representation is to be decompressed temporarily (e.g., "decompress=temp") to facilitate read operations, while rule "r12" indicates that a "compressed" data unit representation that also has a "hot" access attribute (e.g., "access=hot") is to be decompressed permanently (e.g., "decompress=perm") to facilitate read operations.

When the compression parameters have been determined, a set of read instructions are generated in accordance with the compression parameters (step 332). As shown in the example read instructions 349, a "read" instruction for a certain data unit "unitID" at a certain storage "location" can be issued in accordance with the dynamically determined compression parameters. Specifically, and as an example, the compression parameters might indicate that, upon read of the data unit, a "decompress" directive (e.g., temporarily decompress or permanently decompress) is to be observed. The generated read instructions are then executed (e.g., at data I/O controller 358) (step 334). Any remaining updates to the data unit metadata (e.g., at metadata 116) are performed (step 316). As an example of an update to data unit metadata, the "compressed" parameter might be updated to reflect a different, prospective level of compression (e.g., as "level=2") based on the information within a "decompress" directive, or based on interpretation of a "decompress" directive.

FIG. 3C depicts an asynchronous compression technique 3C00 as implemented in systems for in-line fine-grained compression of data in a storage I/O path. As an option, one or more variations of asynchronous compression technique 3C00 or any aspect thereof may be implemented in the context of the architecture and functionality of the embodiments described herein. The asynchronous compression technique 3C00 or any aspect thereof may be implemented in any environment.

The asynchronous compression technique 3C00 presents one embodiment of certain steps and/or operations (e.g., asynchronous compression operations) that identify and/or execute compression operations to be performed on data subjected to the in-line fine-grained compression techniques disclosed herein.

The asynchronous compression technique 3C00 can commence by receiving access log data for a subject data group (step 362). The access log data can be used to determine if the subject data group and/or any of its constituent data units are "cold" (decision 364). For example, a cold data group or unit might have a time period since a last access of greater than three days. If the data is not cold (see "No" path of decision 364), the data can further be analyzed to determine if it is "warm" (decision 366). For example, a warm data group or unit might have a time period since a last access of greater than three hours, but less than three days. If the data is not warm (see "No" path of decision 366), then it is implicitly "hot" by this logic, and no action is taken. If the data is warm (see "Yes" path of decision 366), then the subject data group is analyzed to determine the amount of garbage that is in the subject data group (step 368).

For example, the data unit attributes for the data units comprising the subject data group can be accessed to identify storage locations marked as garbage. Such information can be used to determine a percentage of the storage area associated with the subject data group that is marked as garbage. If the amount (e.g., percentage) of garbage is below a "cleanup" threshold (see "No" path of decision 370), no action is taken. If the amount of garbage exceeds the cleanup threshold (see "Yes" path of decision 370), then certain cleanup actions are performed. Specifically, a new data group is created (step 372$_1$) and the data units from the subject data group are written to the new data group (step 374$_1$). Metadata references are updated to point to the storage locations corresponding to the new data group (step 376$_1$). The storage area associated with the subject data group is then released (step 378$_1$).

Referring again to decision 364, if the subject data group is determined to be cold (see "Yes" path of decision 364), then uncompressed data units from the subject data group are identified (step 382) and a compression gain associated with the identified uncompressed data units is then determined (step 384). Any one or more techniques for determination of a compression gain can be used. For example, in certain embodiments, a compression gain metric might be based on the potential costs of accessing compressed data (e.g., computing costs for decompression, possibly repeated computing costs for decompression, etc.) as compared to the cost savings that might be gained as a result of a reduced storage capacity usage. In some cases, historical and/or predicted access patterns and/or historical and/or predicted tiered storage costs might also be used to determine such compression gain metrics. If the resulting compression gain indicates the uncompressed data units are not to be compressed (see "No" path of decision 386), no action is taken. If one or more of the uncompressed data units are to be compressed (see "Yes" path of decision 386), then certain compression actions are performed. Specifically, a new data group is created (step $372_2$). The identified uncompressed data units are compressed (step 388), all the data units from the subject data group are written to the new data group (step $374_2$), and metadata references are updated to point to the storage locations corresponding to the newly-created data group (step $376_2$). The storage area associated with the subject data group is then released (step $378_2$).

Figure 4A:
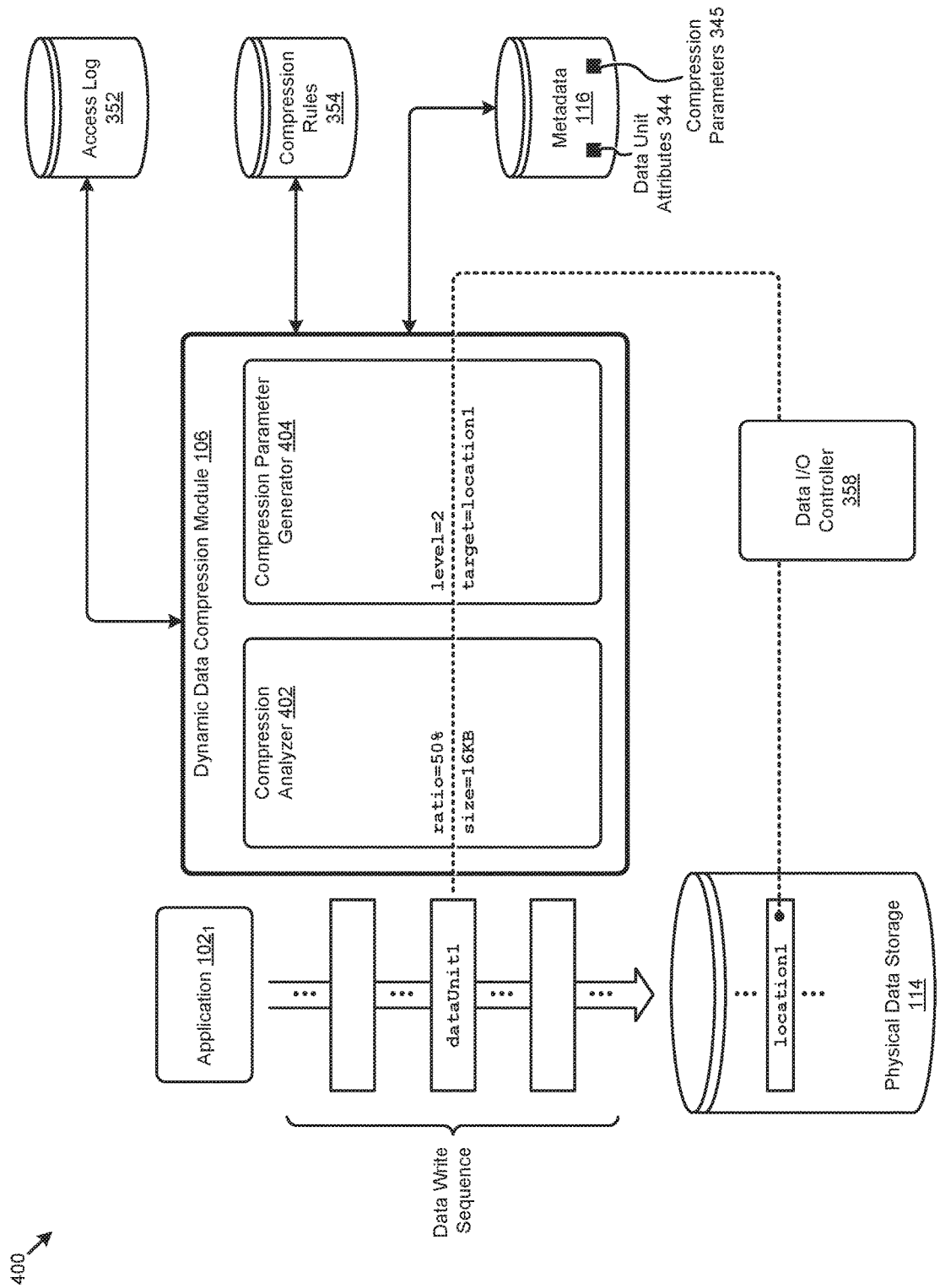
FIG. 4A, FIG. 4B, and FIG. 4C depict an in-line data compression scenario facilitated by systems for in-line fine-grained compression of data in a storage I/O path, according to an embodiment.
Figure 4B:
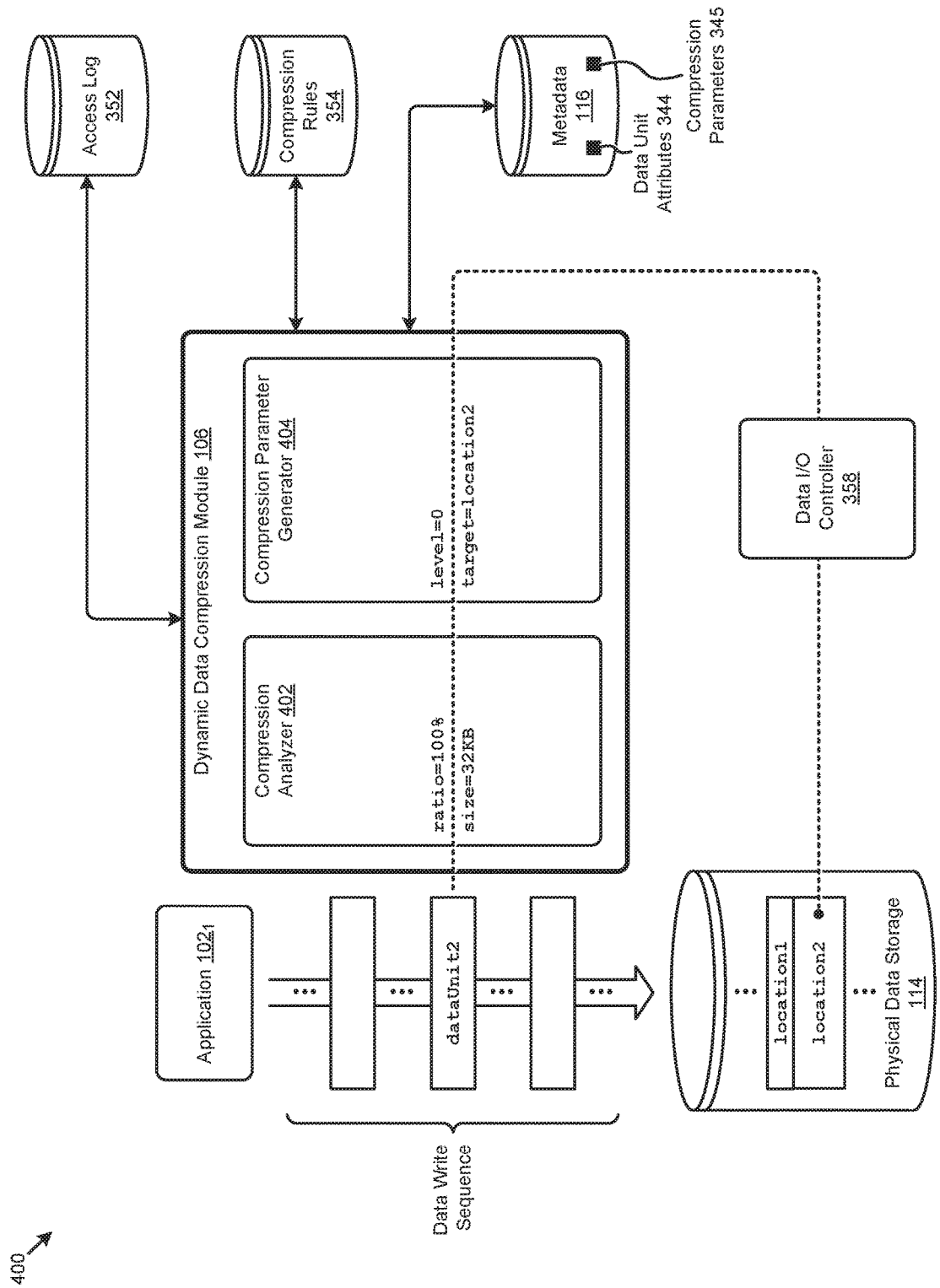
Figure 4C:
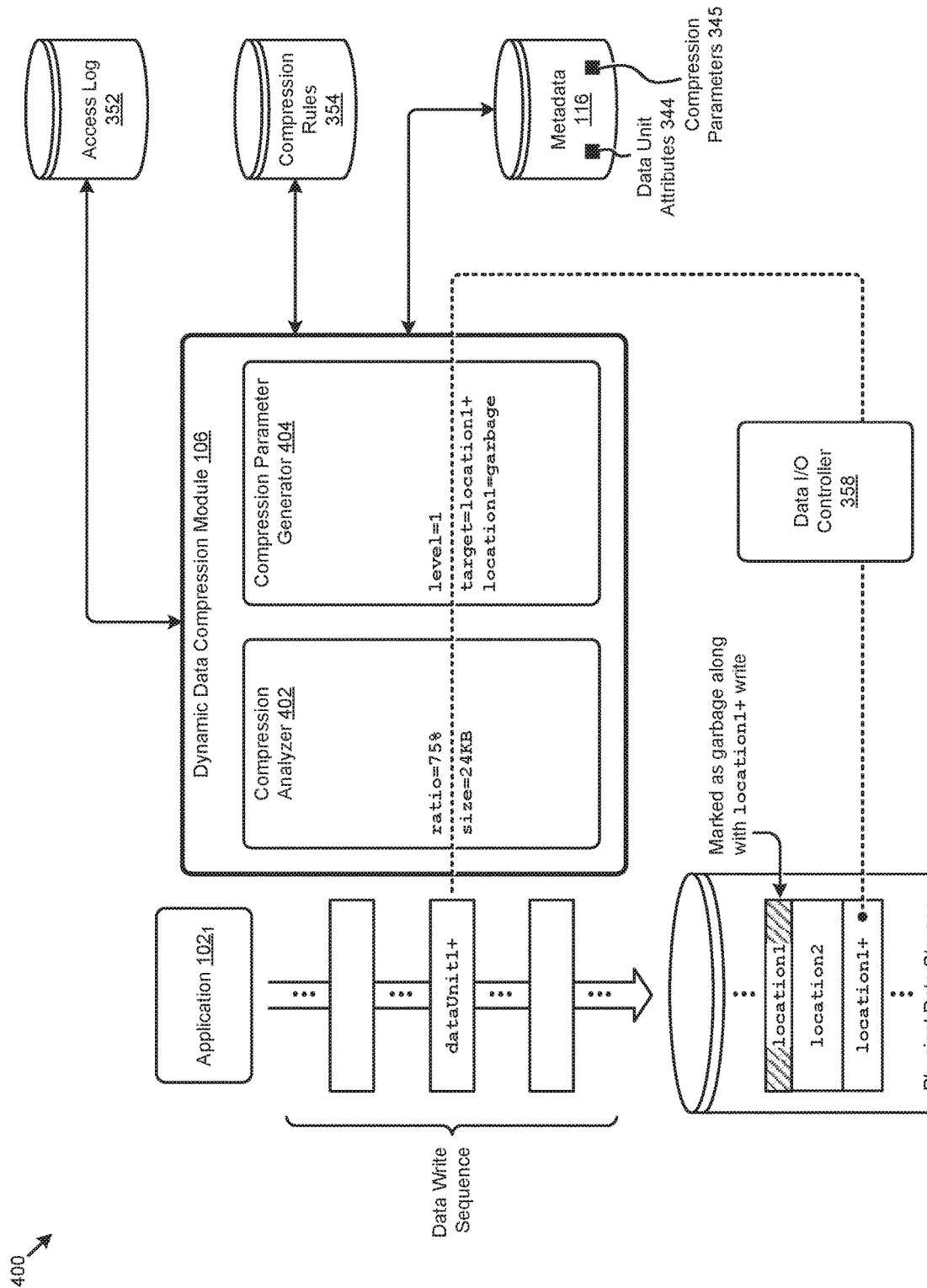

One example of a scenario illustrating the herein disclosed techniques is shown and described as pertaining to the sequence of figures FIG. 4A, FIG. 4B, and FIG. 4C.

FIG. 4A, FIG. 4B, and FIG. 4C illustrate an in-line data compression scenario 400 facilitated by systems for in-line fine-grained compression of data in a storage I/O path. As an option, one or more variations of in-line data compression scenario 400 or any aspect thereof may be implemented in the context of the architecture and functionality of the embodiments described herein. The in-line data compression scenario 400 or any aspect thereof may be implemented in any environment.

The in-line data compression scenario 400 illustrated in FIG. 4A, FIG. 4B, and FIG. 4C depicts certain operations and/or interactions between various earlier described computing components that illustrate the herein disclosed techniques. Specifically, a data write sequence from application $102_1$ is intercepted by dynamic data compression module 106 that implements certain in-line data compression operations performed dynamically on the data as it is written to physical data storage 114 by data I/O controller 358. Such techniques are facilitated at least in part by a compression analyzer 402 and a compression parameter generator 404 at dynamic data compression module 106. As can be observed, dynamic data compression module 106 also interacts with access log 352, compression rules 354, and other data or metadata including data unit attributes 344 and compression parameters 345.

Referring to FIG. 4A, a data unit "dataUnit1" in the data write sequence is analyzed in real time by the compression analyzer 402 to determine a compression ratio (e.g., "ratio=50%") and a compression size (e.g., "sze=16 KB"). The compression parameter generator 404 applies the compression rules 354 to the foregoing attributes and/or other attributes to determine a compression level (e.g., "level=2") and a target storage location (e.g., "target=$location_1$"), as depicted by the example given in compression parameter generator 404. The data I/O controller 358 writes the data unit to the physical data storage 114 in accordance with the level parameter, the target parameters, and/or other compression parameters.

Referring to FIG. 4B, a data unit "dataUnit$_2$" in the data write sequence is analyzed in real time by the compression analyzer 402 to determine a compression ratio (e.g., "ratio=100%") and a compression size (e.g., "size=32 KB"). The compression parameter generator 404 applies the compression rules 354 to the foregoing attributes and/or other attributes to determine a compression level (e.g., "level=0" or no compression) and a target storage location (e.g., "target=location2"). The data I/O controller 358 writes the data unit to the physical data storage 114 in accordance with the level parameter, the target parameters, and/or other compression parameters.

Referring to FIG. 4C, a data unit "dataUnit1+" is received, which data unit is an overwrite of the earlier mentioned data unit "dataUnit1" stored in "location1". The data unit "dataUnit1+" is analyzed in real-time by the compression analyzer 402 to determine a compression ratio (e.g., "ratio=75%") and a compression size (e.g., "size=24 KB"). As can be observed, the compression size is such that "dataUnit1+" does not fit into "location1". The compression parameter generator 404 applies the compression rules 354 to the foregoing attributes and/or other attributes to determine a compression level (e.g., "level=1") and a new target storage location (e.g., "target=location1+"). The storage location "location1" of the earlier stored representation of "dataUnit1" is also marked as garbage (e.g., "location1=garbage"). The data I/O controller 358 writes the data unit to the physical data storage 114 in accordance with the level parameter, the target parameters, the garbage marking directive, and/or other compression parameters.

Garbage (e.g., at "location1") and/or other unused space in physical data storage 114 often accumulates over time. The herein disclosed techniques can be implemented to clean up such garbage as shown and described as pertaining to FIG. 3C. In other cases, the dynamic data compression module 106 can monitor the then-current unused physical storage space (e.g., garbage, cushions, etc.) using metadata 116 to dynamically allocate certain data unit writes and/or overwrites to such free space, thereby eliminating and/or reducing later performed cleanup operations.

Figure 5:
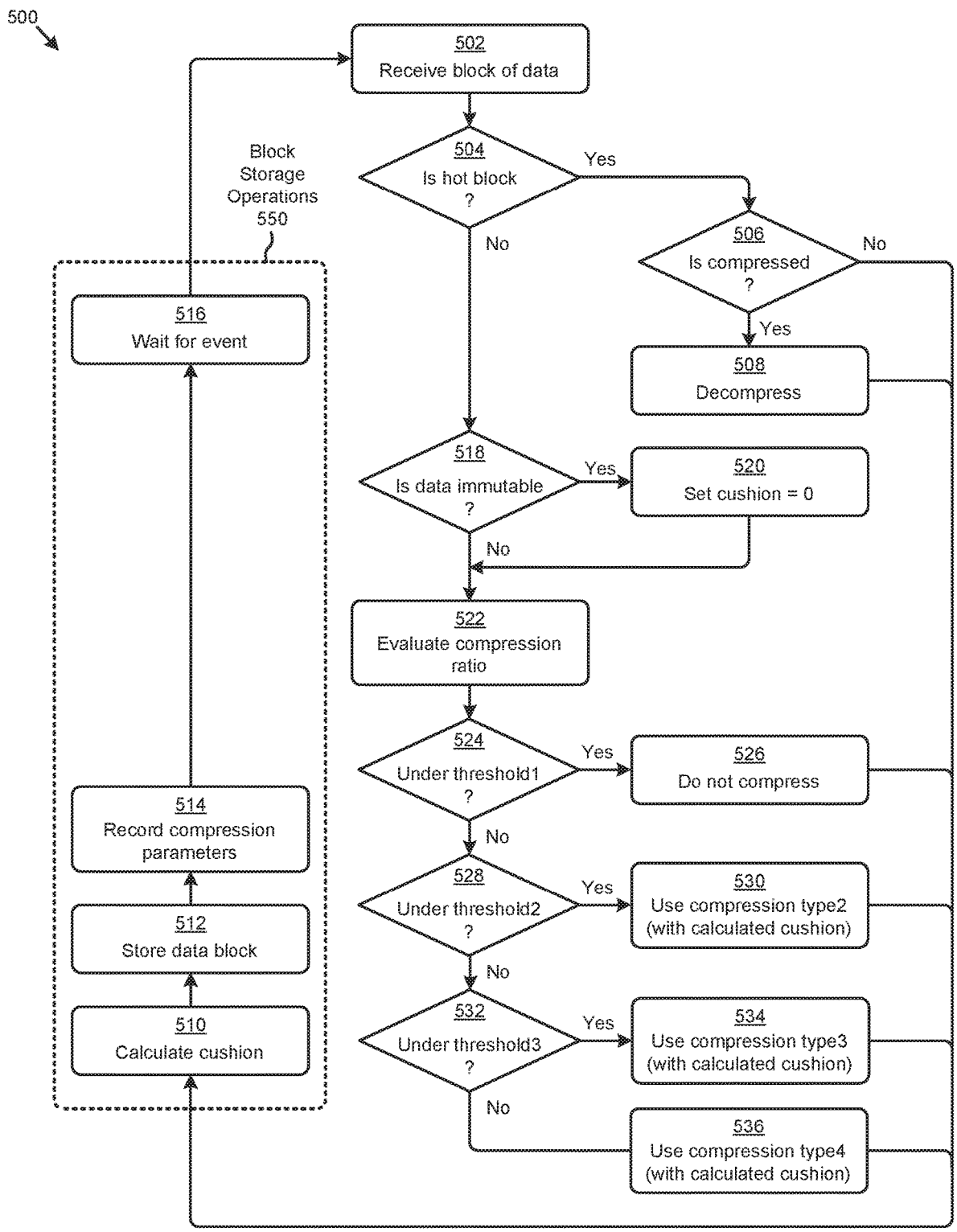
FIG. 5 depicts a compression rule application technique as used for in-line fine-grained compression of data in a storage I/O path, according to some embodiments.

Another embodiment illustrating the herein disclosed techniques is shown and discussed as pertaining to FIG. 5.

FIG. 5 depicts a compression rule application technique 500 as used for in-line fine-grained compression of data in a storage I/O path. As an option, one or more variations of compression rule application technique 500 or any aspect thereof may be implemented in the context of the architecture and functionality of the embodiments described herein. The compression rule application technique 500 or any aspect thereof may be implemented in any environment.

The embodiment shown in FIG. 5 is merely one example. Additional examples are provided in additional flowcharts presented hereunder. FIG. 5 considers the nature and status of a particular block (or file, or region, or extent) to determine what compression techniques should be applied. For example, and as shown, the flow receives a block of data (step 502) and considers if the block is a "hot block" (decision 504). If the block is "hot" (see "Yes" path of decision 504) and the stored representation of the block is compressed (see "Yes" path of decision 506), the stored representation of the block is decompressed (step 508) and certain block storage operations (grouping 550) are executed. Specifically, a cushion is calculated for the block (step 510) and the block is stored (step 512). As an example, some compression techniques use a cushion so as to permit writes of additional data to the block, some of which writes of additional data can be performed without necessarily forcing allocation of an additional block or extent. Any compression parameters associated with the block are recorded (e.g., in metadata) (step 514). The compression rule application technique 500 then waits for an event (e.g., new storage I/O operation) (step 516) to invoke receiving the next block of data. Referring again to decision 504, if the received block is "hot" (see "Yes" path of decision 504) and the stored representation of the block is not compressed (see "No" path of decision 506), then certain block storage operations (grouping 550) are carried out with no decompression of the stored representation.

However, when the received block in not a hot block (see "No" path of decision 504), the flow considers if the block comprises immutable data (decision 518). In hyperconverged storage systems, each block or file or extent has an associated set of metadata. Such metadata can record the nature and status of any block or file or region or extent. As such, the nature and status of any block can be known with great specificity (e.g., with a flag such as "IS_IMMU-TABLE). If the block is immutable (see "Yes" path of decision 518), then the storage cushion for the block is removed (e.g., "cushion=0") (step 520). If the block is not immutable (see "No" path of decision 518) or the cushion has been removed for an immutable block, the flow continues by evaluating a compression ratio for the block (step 522). The compression ratio is compared to various thresholds (e.g., threshold1, threshold2, and threshold3) to determine a corresponding compression technique to apply to the block. As can be observed, no compression is applied (step 526) if the compression ratio is under threshold1 (see "Yes" path of decision 524), compression type2 is applied (step 530) if the compression ratio is under threshold2 (see "Yes" path of decision 528), compression type3 is applied (step 534) if the compression ratio is under threshold3 (see "Yes" path of decision 532), and compression type4 is applied (step 536) if the compression ratio is over threshold3 (see "No" path of decision 532). The block storage operations are then executed in accordance with the earlier determined compression types.

In certain embodiments, the herein disclosed techniques can be implemented to facilitate in-line compression and/or decompression operations in a tiered storage environment. One example of such an embodiment is presented and discussed as pertains to FIG. 6.

Figure 6:
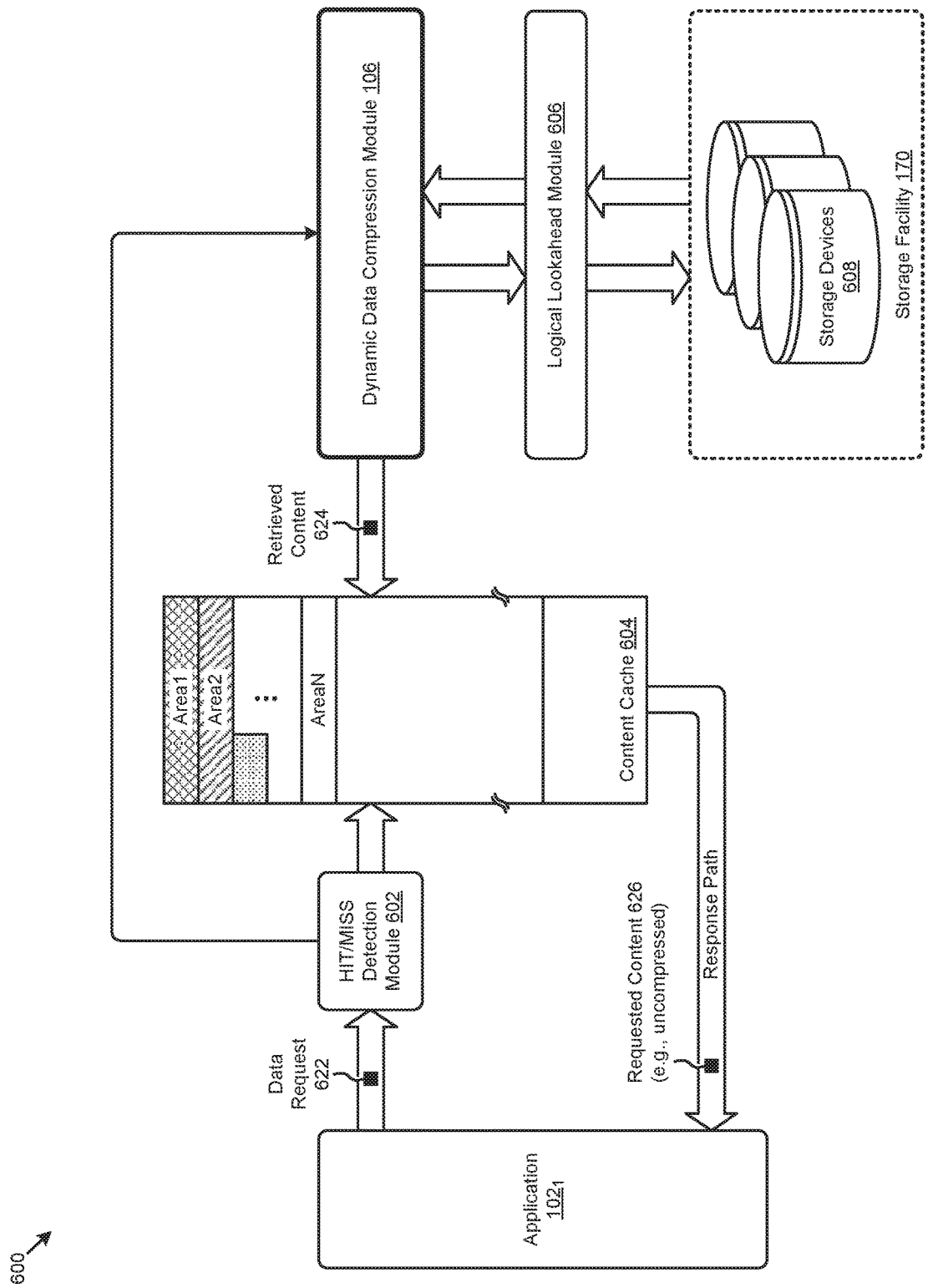
FIG. 6 presents a cache decompression lookahead technique as implemented in systems for in-line fine-grained compression of data in a storage I/O path, according to some embodiments.

FIG. 6 presents a cache decompression lookahead technique 600 as implemented in systems for in-line fine-grained compression of data in a storage I/O path. As an option, one or more variations of cache decompression lookahead technique 600 or any aspect thereof may be implemented in the context of the architecture and functionality of the embodiments described herein. The cache decompression lookahead technique 600 or any aspect thereof may be implemented in any environment.

The embodiment shown in FIG. 6 is merely one example of an implementation of the herein disclosed techniques for facilitating in-line compression and/or decompression of data transferred between storage tiers. Specifically, the dynamic data compression module 106 is shown between a content cache 604 and storage facility 170 comprising multiple instances of storage devices 608. The content cache 604 might facilitate a low latency access by application $102_1$ to a set of data that is determined to be "hot" (e.g., accessed often), while the storage devices 608 might store "warm" or "cold" data. Further, the data in content cache 604 might be uncompressed, also to facilitate low latency access, while the data in storage devices 608 might comprise at least some compressed data.

When a data request 622 is issued from application $102_1$, a HIT/MISS detection module 602 can determine if the data requested is in content cache 604 (e.g., a "hit") or not in content cache 604 (e.g., a "miss"). If a "miss" is detected, HIT/MISS detection module 602 can invoke dynamic data compression module 106 to interact with a logical lookahead module 606 to retrieve the requested data from the storage devices 608. The herein disclosed techniques can be applied by the dynamic data compression module 106 to perform an in-line compression analysis of the retrieved content 624 as it moves in the data I/O path from the storage devices 608 to the content cache 604. For example, if the retrieved content 624 has an increasing frequency of access, the content might be permanently decompressed at the storage devices 608 and/or the content cache 604. The requested content 626 (e.g., uncompressed data) pertaining to the earlier invoked data request can be returned to application $102_1$ in the response path.

Figure 7:
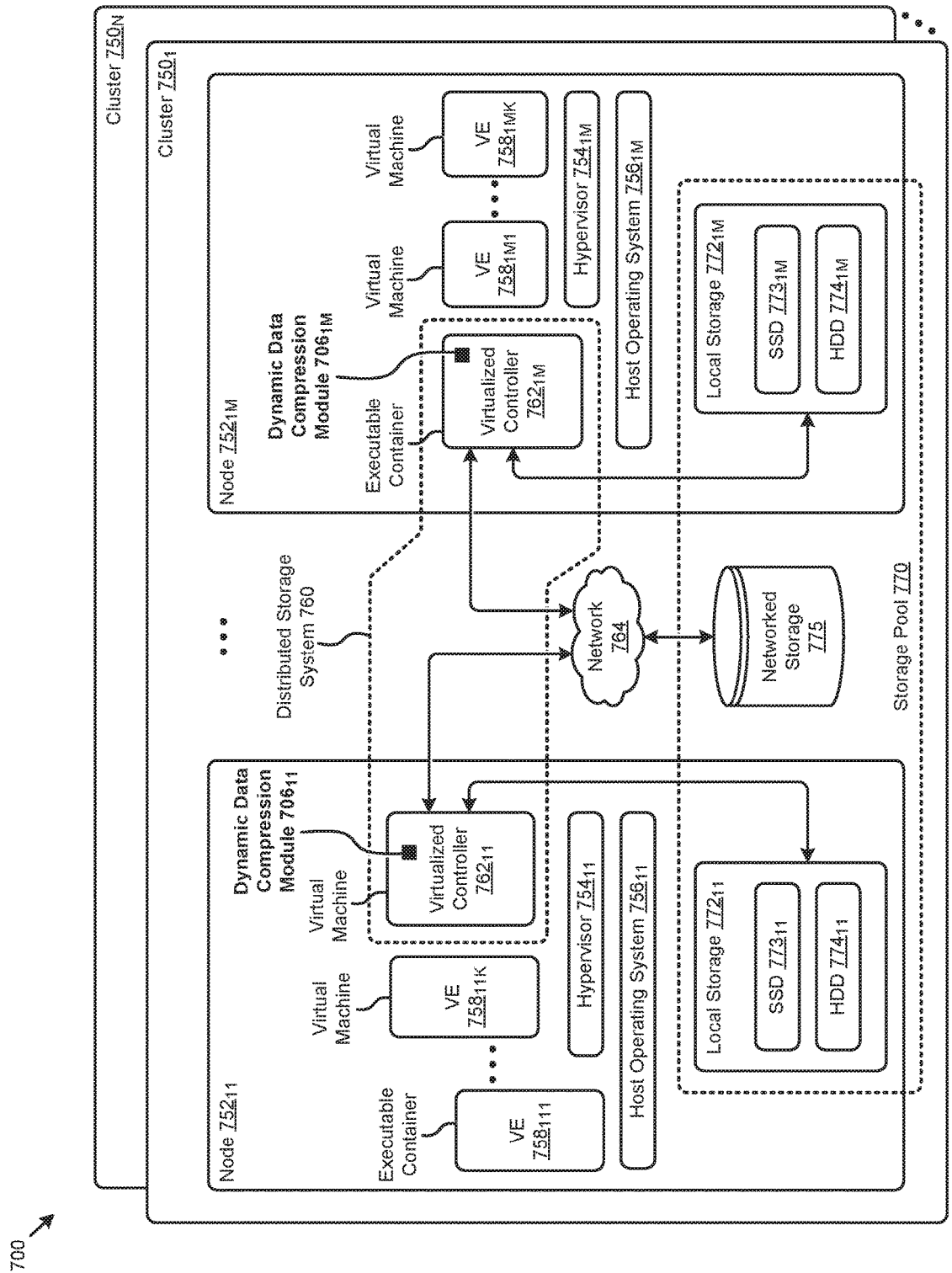
FIG. 7 presents a distributed virtualization environment in which embodiments of the present disclosure can operate.

An example of a distributed virtualization environment (e.g., distributed computing environment, hyperconverged distributed computing environment, etc.) that supports any of the herein disclosed techniques is presented and discussed as pertains to FIG. 7.

FIG. 7 presents a distributed virtualization environment 700 in which embodiments of the present disclosure can operate. As an option, one or more variations of distributed virtualization environment 700 or any aspect thereof may be implemented in the context of the architecture and functionality of the embodiments described herein. The distributed virtualization environment 700 or any aspect thereof may be implemented in any environment.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization environment 700 comprises multiple clusters (e.g., cluster $750_1$, . . . , cluster $750_N$) comprising multiple nodes that have multiple tiers of storage in a storage pool 770. Representative nodes (e.g., node $752_{11}$, . . . , node $752_{1M}$) and storage pool 770 associated with cluster $750_1$ are shown. Each node can be associated with one server, multiple servers, or portions of a server. The nodes can be associated (e.g., logically and/or physically) with the clusters. As shown, the multiple tiers of storage include storage that is accessible through a network 764 such as a networked storage 775 (e.g., a storage area network or SAN, network attached storage or NAS, etc.). The multiple tiers of storage further include instances of local storage (e.g., local storage $772_{11}$, . . . , local storage $772_{1M}$). For example, the local storage can be within or directly attached to a server and/or appliance associated with the nodes. Such local storage can include solid state drives (SSD $773_{11}$, . . . , SSD $773_{1M}$), hard disk drives (HDD $774_{11}$, . . . , HDD $774_{1M}$), and/or other storage devices.

As shown, the nodes in distributed virtualization environment 700 can implement one or more user virtualized entities (e.g., VE $758_{111}$, . . . , VE $758_{11K}$, . . . , VE $758_{1M1}$, . . . , VE $758_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}, \ldots,$ host operating system $756_{1M}$), while the VMs run multiple applications on various respective guest operating systems. Such flexibility can be facilitated at least in part by a hypervisor (e.g., hypervisor $754_{11}, \ldots,$ hypervisor $754_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}, \ldots,$ host operating system $756_{1M}$) without, in most cases, a hypervisor layer. This lightweight implementation can facilitate efficient distribution of certain software components such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of a dynamic data compression module can be implemented in the distributed storage system 760 to facilitate the herein disclosed techniques. Specifically, dynamic data compression module instance $706_{11}$ can be implemented in the virtualized controller $762_{11}$, and dynamic data compression module instance $706_{1M}$ can be implemented in the virtualized controller $762_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., dynamic data compression module).

Additional Embodiments of the Disclosure

Additional Practical Application Examples

Figure 8:
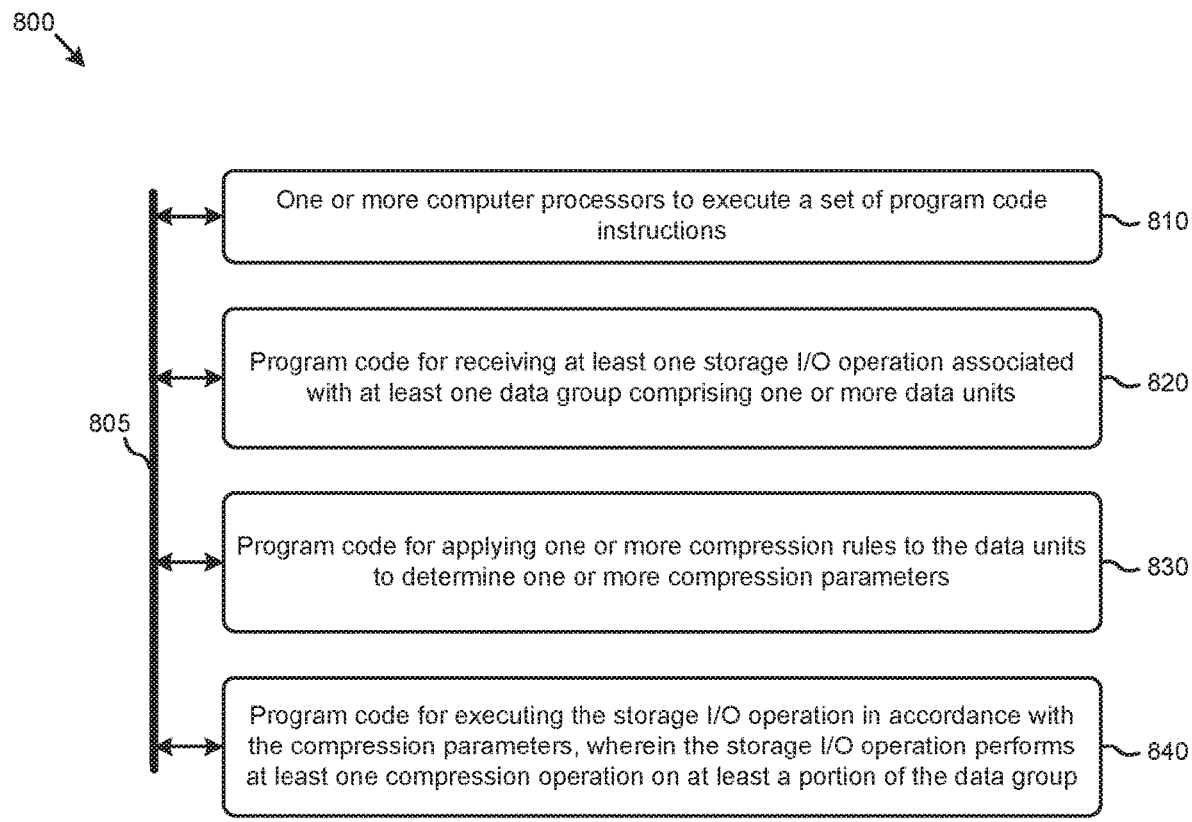
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address achieving efficient persistent storage data compression in highly dynamic computing and storage systems. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: receiving at least one storage I/O operation associated with at least one data group comprising one or more data units (module 820); applying one or more compression rules to the data units to determine one or more compression parameters (module 830); and executing the storage I/O operation in accordance with the compression parameters, wherein the storage I/O operation performs at least one compression operation on at least a portion of the data group (module 840).

Figure 9A:
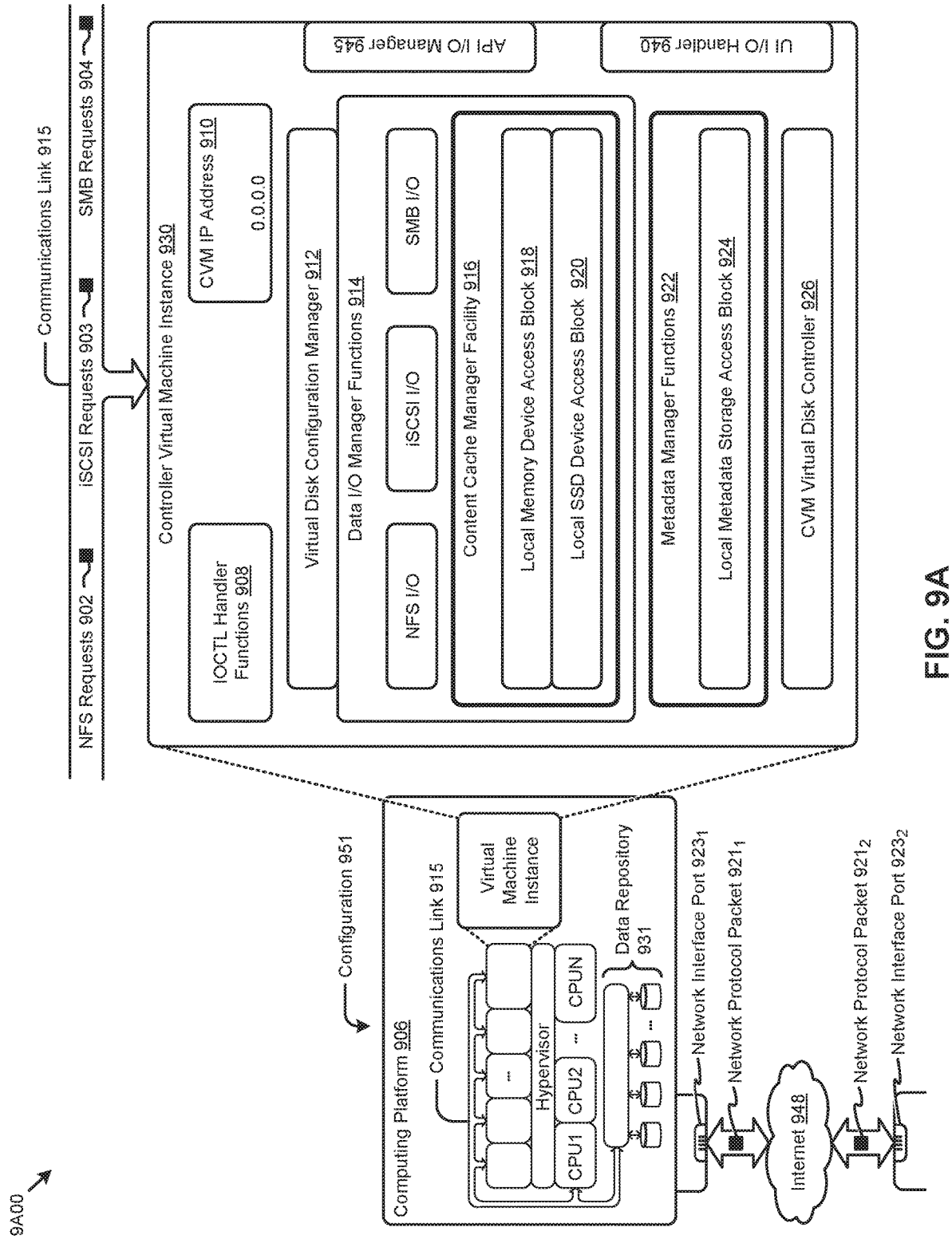
FIG. 9A, FIG. 9B and FIG. 9C depict virtualized controller architectures comprising collections of interconnected components suitable for implementing embodiments of the present disclosure and/or for use in the herein-described environments.

Variations of the foregoing may include more or fewer of the shown modules. Certain variations may perform more or fewer (or different) steps, and/or certain variations may use data elements in more, or in fewer (or different) operations.

System Architecture Overview
Additional System Architecture Examples FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 9A00 comprises a collection of interconnected components suitable for implementing embodiments of the present disclosure and/or for use in the herein-described environments. Moreover, the shown virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to the other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to in-line fine-grained compression of data in a storage I/O path. In some embodiments, a module may include one or more state machines and/or combinational logic used to implement or facilitate the operational and/or performance characteristics pertaining to in-line fine-grained compression of data in a storage I/O path.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of in-line fine-grained compression of data in a storage I/O path). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to in-line fine-grained compression of data in a storage I/O path, and/or for improving the way data is manipulated when performing computerized operations pertaining to implementing a fine-grained compression analysis of data during performance of storage I/O operations to dynamically determine compression instructions for the data.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
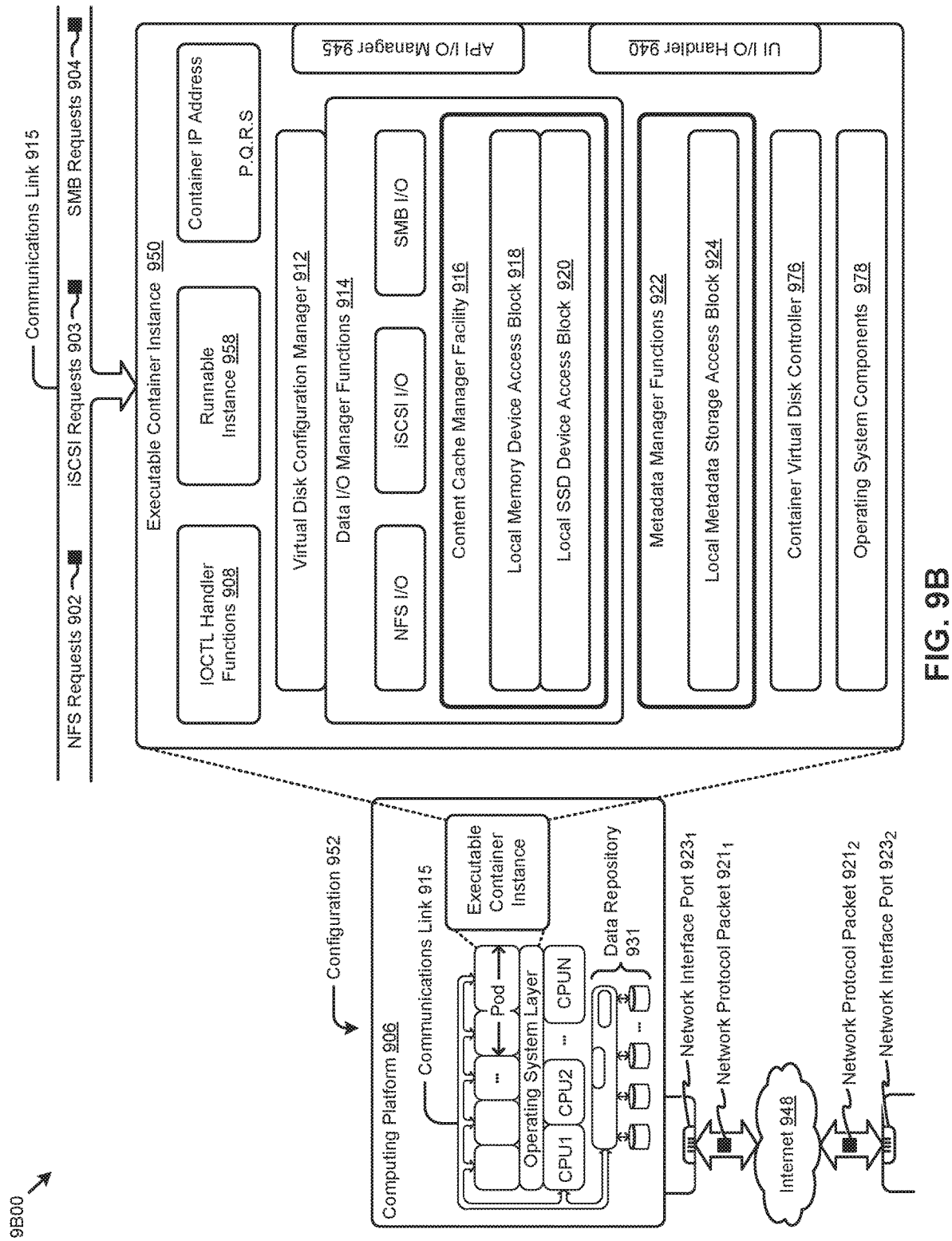

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
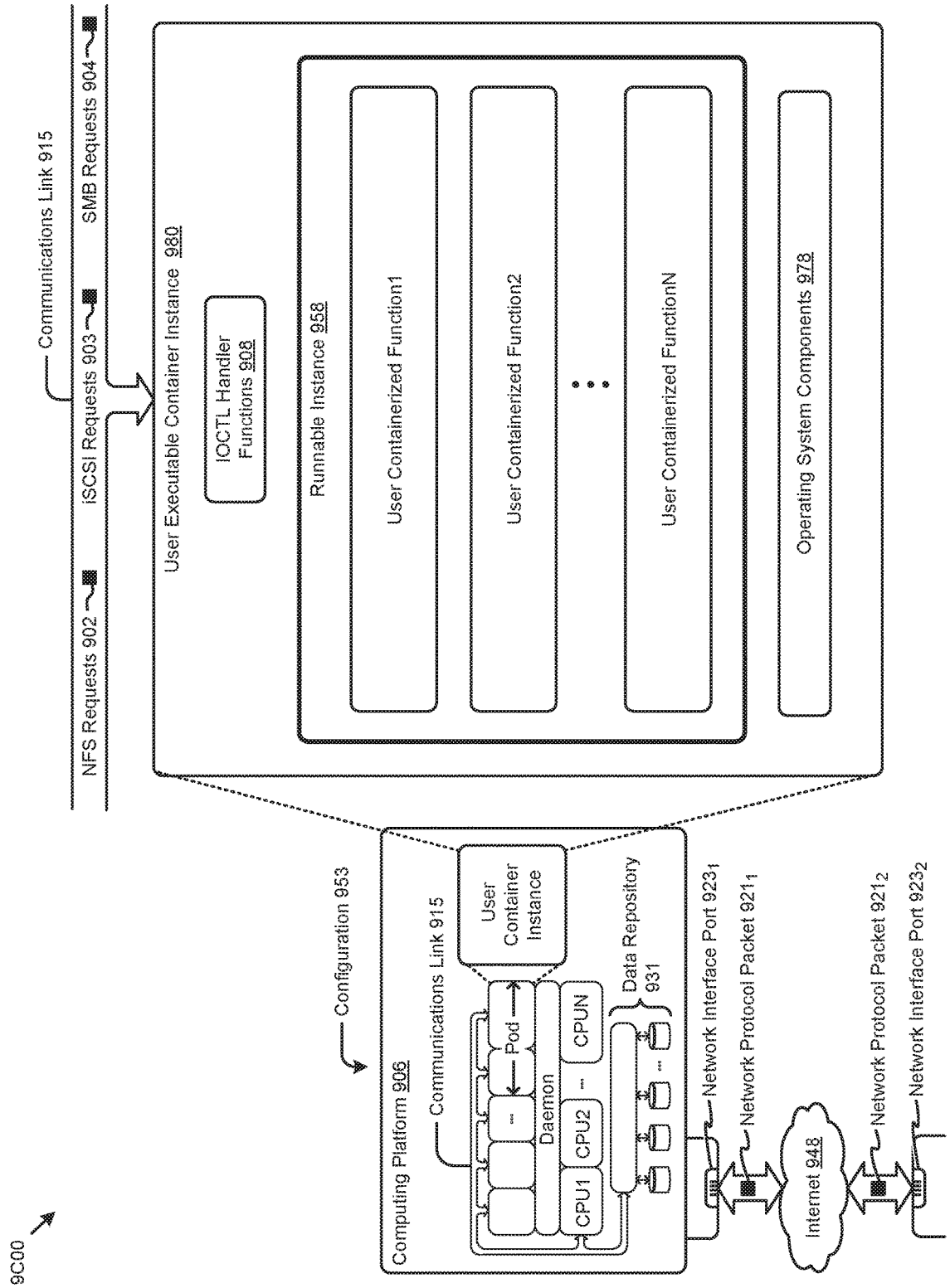

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture 9C00 includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of the daemon-assisted containerized architecture 9C00, computing platform 906 might or might not host operating system components other than operating system components 978. More specifically, the shown daemon might or might not host operating system components other than operating system components 978 of user executable container instance 980.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
   receiving a request to write data from an application;
   partitioning the data into a plurality of data units;
   processing the plurality of data units to execute the request to write data from the application, wherein each data unit of the plurality of data units is processed by:
   applying a compression rule to a respective data unit of the plurality of data units to determine a corresponding compression parameter for the respective data unit; and
   performing, in accordance with the corresponding compression parameter for the respective data, an in-line data compression operation on the respective data unit, wherein the in-line data compression operation is executed in-line with writing the respective data unit in response to the request to write data.

2. The method of claim 1, wherein the plurality of data units are processed before returning a status pertaining to the execution of the request to write data from the application.

3. The method of claim 1, wherein processing the respective data units further comprises performing a compression efficiency test over the data unit to determine a data unit attribute associated with the request to write data.

4. The method of claim 1, wherein a first data unit from the data is compressed using a first compression parameter and a second data unit from the data is compressed using a second compression parameter different from the first compression parameter.

5. The method of claim 1, wherein processing the respective data units further comprises updating a set of metadata to describe the corresponding compression parameter for the respective data unit and metadata for a first data unit from the data is updated to reflect an attribute of compression of the first data unit and metadata for a second data unit from the data is updated to reflect an attribute of compression of the second data unit different from the attribute of compression of the first data unit.

6. The method of claim 1, wherein a first data unit from the data is compressed using a first algorithm and a second data unit from the data is compressed using a second algorithm different from the first algorithm.

7. The method of claim 1, wherein a first data unit from the data is compressed at a first level and a second data unit from the data is compressed using at second level different from the first level.

8. The method of claim 1, wherein the corresponding compression parameter characterize at least one of, a storage device, a compression level, a compression type, a compression algorithm, a storage allocation cushion, or a compression delay.

9. The method of claim 1, wherein the data comprises at least one of, an extent, a slice, a block, an area, or a region.

10. A non-transitory computer readable medium having stored thereon a sequence of instructions which, when executed by a processor causes a set of acts comprising:
    receiving a request to write data from an application;
    partitioning the data into a plurality of data units;
    processing the plurality of data units to execute the request to write data from the application, wherein each data unit of the plurality of data units is processed by:
    applying a compression rule to a respective data unit of the plurality of data units to determine a corresponding compression parameter for the respective data unit; and
    performing, in accordance with the corresponding compression parameter for the respective data, an in-line data compression operation on the respective data unit, wherein the in-line data compression operation is executed in-line with writing the respective data unit in response to the request to write data.

11. The computer readable medium of claim 10, wherein the plurality of data units are processed before returning a status pertaining to the execution of the request to write data from the application.

12. The computer readable medium of claim 10, wherein processing the respective data units further comprises performing a compression efficiency test over the data unit to determine a data unit attribute associated with the request to write data.

13. The computer readable medium of claim 10, wherein a first data unit from the data is compressed using a first compression parameter and a second data unit from the data is compressed using a second compression parameter different from the first compression parameter.

14. The computer readable medium of claim 10, wherein processing the respective data units further comprises updating a set of metadata to describe the corresponding compression parameter for the respective data unit and metadata for a first data unit from the data is updated to reflect an attribute of compression of the first data unit and metadata for a second data unit from the data is updated to reflect an attribute of compression of the second data unit different from the attribute of compression of the first data unit.

15. The computer readable medium of claim 10, wherein a first data unit from the data is compressed using a first algorithm and a second data unit from the data is compressed using a second algorithm different from the first algorithm.

16. The computer readable medium of claim 10, wherein a first data unit from the data is compressed at a first level and a second data unit from the data is compressed using at second level different from the first level.

17. The computer readable medium of claim 10, wherein the corresponding compression parameter characterize at least one of, a storage device, a compression level, a compression type, a compression algorithm, a storage allocation cushion, or a compression delay.

18. The computer readable medium of claim 10, wherein the data comprises at least one of, an extent, a slice, a block, an area, or a region.

19. A system, comprising:
    a processor to execute a set of instructions;
    a memory to hold the set of instructions, in which the set of instructions comprises instructions to perform:
    receiving a request to write data from an application;
    partitioning the data into a plurality of data units;
    processing the plurality of data units to execute the request to write, wherein each data unit of the plurality of data units is processed by:
    applying a compression rule to a respective data unit of the plurality of data units to determine a corresponding compression parameter for the respective data unit; and
    performing, in accordance with the corresponding compression parameter for the respective data, an in-line data compression operation on the respective data unit, wherein the in-line data compression operation is executed in-line with writing the respective data unit in response to the request to write data.

20. The system of claim 19, wherein the plurality of data units are processed before returning a status pertaining to the execution of the request to write data from the application.

21. The system of claim 19, wherein processing the respective data units further comprises performing a compression efficiency test over the data unit to determine a data unit attribute associated with the request to write data.

22. The system of claim 19, wherein a first data unit from the data is compressed using a first compression parameter and a second data unit from the data is compressed using a second compression parameter different from the first compression parameter.

23. The system of claim 19, wherein processing the respective data units further comprises updating a set of metadata to describe the corresponding compression parameter for the respective data unit and metadata for a first data unit from the data is updated to reflect an attribute of compression of the first data unit and metadata for a second data unit from the data is updated to reflect an attribute of compression of the second data unit different from the attribute of compression of the first data unit.

24. The system of claim 19, wherein a first data unit from the data is compressed using a first algorithm and a second data unit from the data is compressed using a second algorithm different from the first algorithm.

25. The system of claim 19, wherein a first data unit from the data is compressed at a first level and a second data unit from the data is compressed using at second level different from the first level.

26. The system of claim 19, wherein the corresponding compression parameter characterize at least one of, a storage device, a compression level, a compression type, a compression algorithm, a storage allocation cushion, or a compression delay.

27. The system of claim 19, wherein the data comprises at least one of, an extent, a slice, a block, an area, or a region.

* * * * *